United States Patent [19]
Inoue et al.

[11] Patent Number: 5,159,830
[45] Date of Patent: Nov. 3, 1992

[54] MACHINE FOR TESTING CENTRIFUGAL LOAD OF BEARING

[75] Inventors: Hiroshi Inoue, Chigasaki; Takehiko Hara, Yokohama; Kengo Hidano, Fujisawa, all of Japan

[73] Assignee: Nippon Thompson Co., Ltd., Tokyo, Japan

[21] Appl. No.: 698,849

[22] Filed: May 13, 1991

[30] Foreign Application Priority Data

May 28, 1990 [JP] Japan .................. 2-137680

[51] Int. Cl.$^5$ .......................... G01M 19/00
[52] U.S. Cl. ...................... 73/118.1; 73/10
[58] Field of Search .......... 73/118.1, 10, 865.6, 73/64, 593

[56] References Cited
FOREIGN PATENT DOCUMENTS 1550350  3/1990  U.S.S.R. .................. 73/593

Primary Examiner—Jerry W. Myracle
Attorney, Agent, or Firm—Rogers & Killeen

[57] ABSTRACT

A machine for testing a centrifugal load of a bearing including an outer race member, comprising a supporting frame including a sun ring, and a rotational main shaft. The rotational main shaft includes mounting portions for mounting the bearing to be tested. The mounting portions includes a mounting shaft for mounting the bearing to be tested and a supporting bracket for supporting the mounting shaft. The mounting shaft is arranged in the supporting bracket in parallel with the rotational main shaft in such a manner that a part of an outer peripheral surface of the outer race member is projected radially outwardly from the supporting bracket. The mounting shaft is journaled to a supporting bracket with a displacing margin in a radially outward direction to the rotational main shaft. An inner peripheral surface of the sun ring is used as a track to be rolled with the outer race members of the respective bearings to be tested. The bearings are rotated around the rotational shaft and around their own axes along the inner peripheral surface of the sun ring.

2 Claims, 5 Drawing Sheets

FIG. 1

MACHINE FOR TESTING CENTRIFUGAL LOAD OF BEARING

BACKGROUND OF THE INVENTION

This invention relates to a testing machine adapted to perform an endurance test such as a seizure resistance test of bearings to be rotated around a main shaft and rotated around their own axes such as a needle cage applied between the large end of a connecting rod and a crank pin of an internal combustion engine to be remarkably effected by centrifugal force.

There has been known as a testing machine for conducting a life test or the like of bearings a testing machine for loading a static load or a variable load as described on pages 31 to 39 of an organ "Lubrication" Vol. 7, No. 1 issued by the Japan Lubrication Society (on Jan. 1, 1962).

As schematically shown in FIG. 6, in this conventional testing machine, bearings B to be tested are mounted at both ends of a main rotational shaft A to be rotated integrally with the main rotational shaft A, and loads are applied to the bearings B to be tested in a load frame E by a spring D for applying a load to the bearings B to be tested in a direction of an arrow C. The bearings B are tested by maintaining the load by the spring D constant or varying the load in a sine curve state.

As apparent from FIG. 6, in the conventional testing machine, the rotational frequency of the bearing B to be tested is always the same as that of the main rotational shaft A, and this testing machine cannot perform an endurance test of bearings such as a seizure resistance test in a state that centrifugal force is applied to the bearings, i.e., in a state that the bearings B to be tested are rotated around the main rotational shaft A and also around their own axes simultaneously.

SUMMARY OF THE INVENTION

An object of this invention is to provide a machine for testing an endurance test of bearings such as seizure resistance performance of bearings to be tested, placed in a using state in combination of rotations around a main rotational shaft and around their own axes under an action of a big centrifugal load substantially near actual using conditions.

According to first aspect of this invention, there is provided a machine for testing a centrifugal load of a bearing including an outer race member, comprising a supporting frame including a sun ring, and a rotational main shaft including mounting portions for mounting the bearing to be tested, said mounting portions including a mounting shaft for mounting the bearing to be tested and a supporting bracket for supporting said mounting shaft, said mounting portions being fixedly projected integrally from an outer peripheral portion of said rotational main shaft at an equal interval in a circumferential direction, each of said mounting portions having the same structure, said mounting shaft being arranged in said supporting bracket in parallel with the rotational main shaft in such a manner that a part of an outer peripheral surface of said outer race member is projected radially outwardly from said supporting bracket, said mounting shaft being journaled to a supporting bracket with a displacing margin in a radially outward direction to said rotational main shaft, said sun ring being concentric with said rotational main shaft and surrounding said mounting portion, and an inner peripheral surface of said sun ring being used as a track to be rolled with the outer race members of said respective bearings to be tested. According to second aspect of this invention, there is provided a machine wherein an outer diameter of a supported part of said mounting shaft is smaller than an inner diameter of an axial bore of said supporting bracket.

In the first aspect of this invention, when the bearings to be tested are mounted at the mounting shafts for mounting the bearings to be tested, the outer race members of the respective bearings to be tested are brought into contact with the inner peripheral surface of the sun ring surrounding the mounting portions, or opposed with a small gap.

When the rotational main shaft is rotatably driven in this state, the bearings to be tested are rotated around the rotational main shaft at an equal speed to that of the rotational main shaft, and the outer race members of the respective bearings to be tested rotate on the inner peripheral surface of the sun ring as a track.

The bearings to be tested are rotated around the rotational main shaft, and the outer race members of the respective bearings to be tested are simultaneously rotated around their own axes along the inner peripheral surface of the sun ring.

Since the mounting shafts of the bearings to be tested are journaled to the supporting bracket with a displacing margin toward the radially outward direction with respect to the rotational main shaft, the outer race members of the bearings to be tested are strongly brought into contact with the inner peripheral surface of the sun ring by the centrifugal force generated upon rotation of the bearings around the rotational main shaft. Thus, as the rotating speed of the rotational main shaft is accelerated faster, the outer race members of the bearings to be tested are rotated around their own axes by the strong centrifugal force. In this manner, an endurance test such as a seizure resistance test can be executed in a state similar to the actual using conditions.

According to the second aspect of this invention, the radially outward deviation of the mounting shaft can be effectively generated by the difference between the diameter of the axial bore of the supporting bracket and the diameter of the mounting shaft.

BRIEF EXPLANATION OF THE DRAWINGS

FIGS. 1 to 5 show embodiments of first and second aspects as claimed in claims 1 and 2 of this invention, FIG. 1 is an enlarged longitudinal sectional side vie of a major portion, FIG. 2 is a side view showing in section a major portion of the embodiment, FIG. 3 is a view in section of the portion in FIG. 2 as seen from arrows with lines III—III, FIG. 4 is a view showing a side view shown in FIG. 1 as seen from arrows with lines IV—IV in FIG. 1, FIG. 5 is a longitudinal sectional side view of a different example of the side plate.

PREFERRED EMBODIMENT OF THE INVENTION

Figure 1:
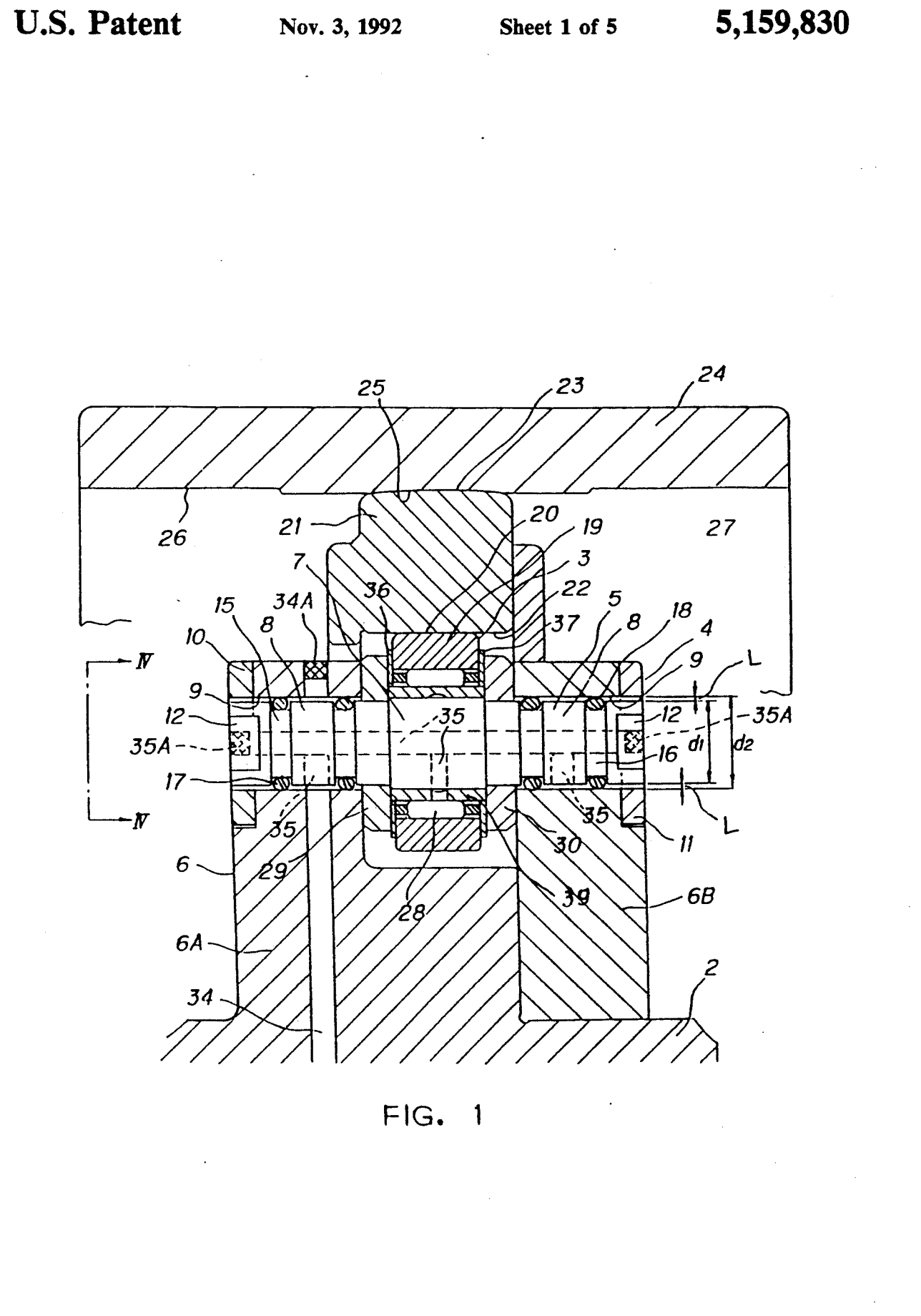
Figure 2:
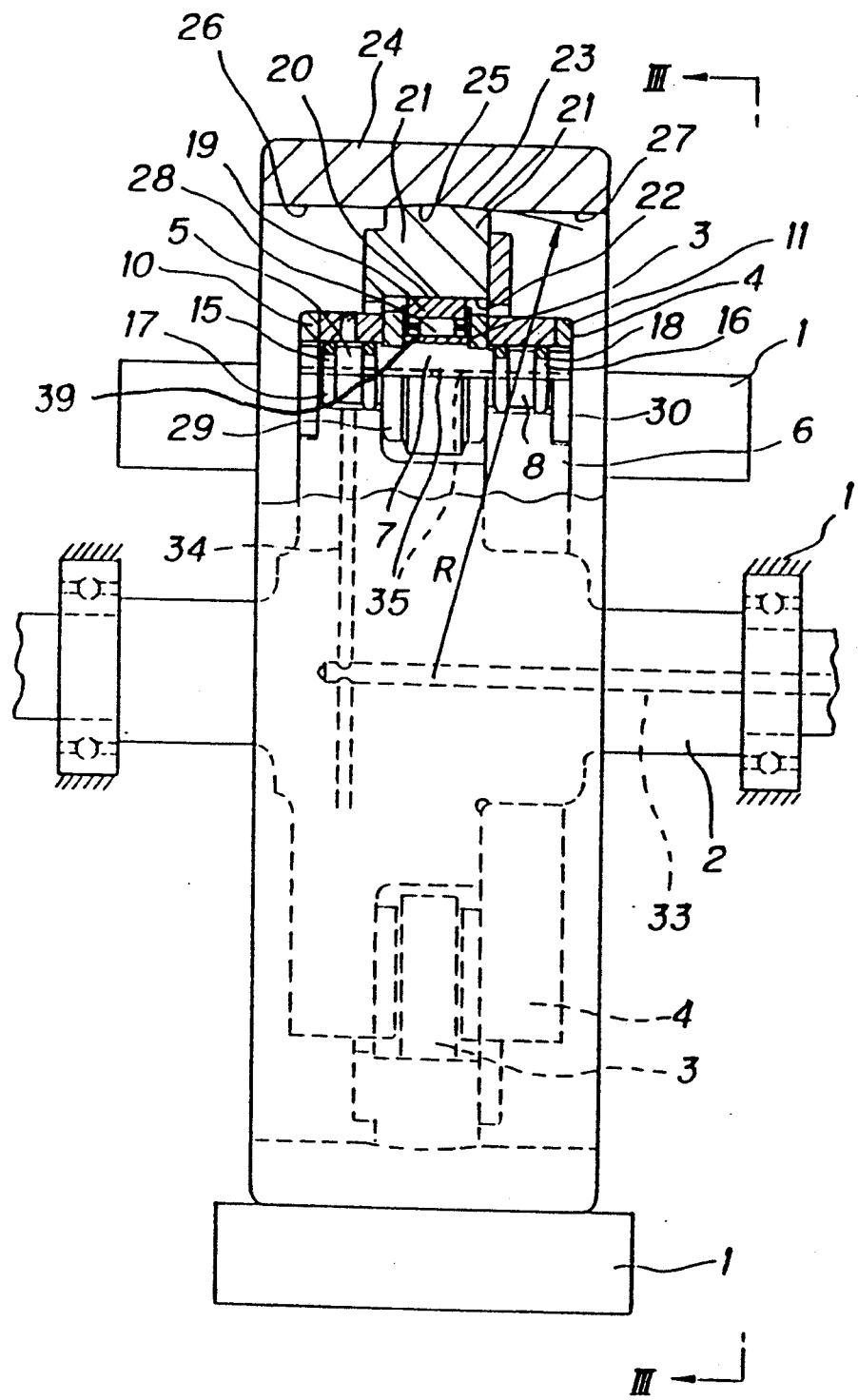
Figure 3:
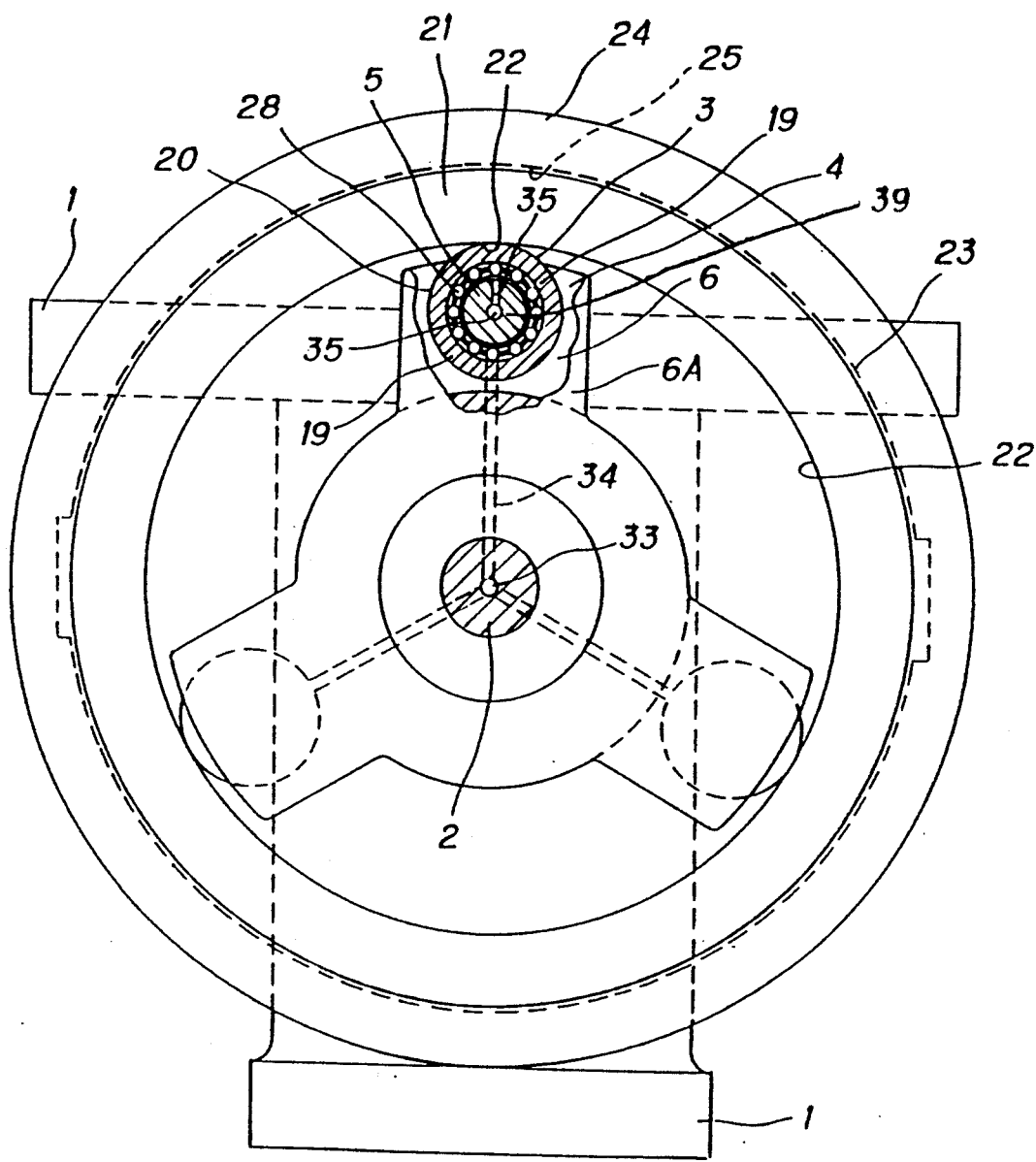

FIGS. 1 to 5 show embodiments of the present invention.

A rotational main shaft 2 is journaled to a supporting frame 1. Mounting portions 4 for mounting bearings 3 to be tested are fixedly projected integrally at an equal interval in a circumferential direction from the outer peripheral portions of the rotational main shaft 2. In the embodiment shown in FIGS. 1 and 2, three sets of mounting portions 4 are projected at an angular interval of 120° from the rotational main shaft 2. However, this invention is not limited to the three sets of the mounting portions 4 of the particular embodiment.

In the illustrated embodiment, the respective bearing 3 to be tested is a yoke type track roller bearing and includes an outer race member 19, an inner race member 39 and a needle cage 28.

The supporting frame 1 includes an outer ring 24 fixed to the supporting frame 1 and a sun ring 21 fixed to the outer ring 24.

The respective mounting portions 4 are constructed in the same structure. Each mounting portion 4 includes a supporting bracket 6 and a mounting shaft 5 for mounting the bearing 3 to be tested, which shaft is journaled to the supporting bracket 6.

As shown in FIGS. 1 and 2, the mounting shaft 5 comprises a mounting part 7 and a supported part 8 supported by the supporting bracket 6. The relationship between an outer diameter $d_1$ of the supported part 8 of the mounting shaft 5 and an inner diameter $d_2$ of the supporting bracket 6 is $d_2 > d_1$. In other words, a radial gap L is set between the supported part 8 and the supporting bracket 6, and is larger than that of the bearing 3 to be tested.

The above-described supporting bracket 6 comprises a stationary bracket 6A coupled integrally to the rotational main shaft 2 and a detachable bracket 6B. The stationary bracket 6A and the detachable bracket 6B have an bores 9 through which the mounting shaft 5 is inserted. Side plates 10 and 11 are respectively detachably attached to the outsides of the stationary bracket 6A and the detachable bracket 6B.

Figure 4:
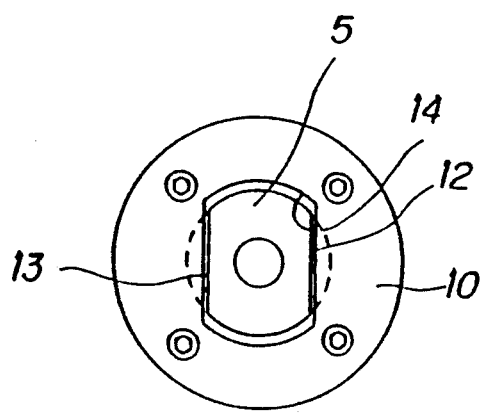
Figure 5:
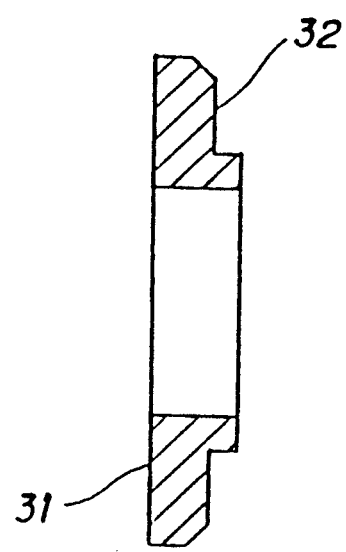
Figure 6:
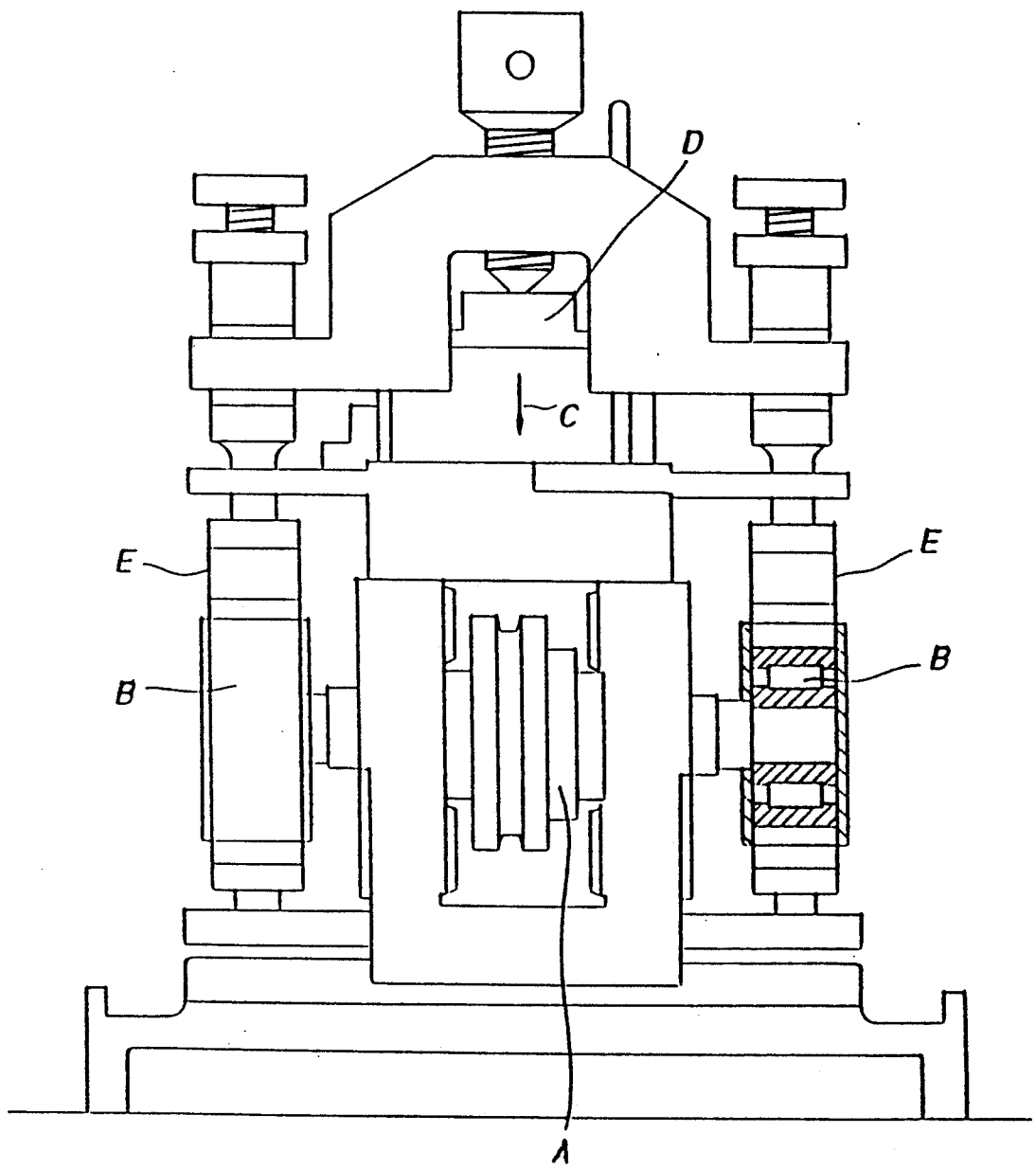
FIG. 6 is a front view of a conventional testing machine.

As shown in FIGS. 1 and 4, the mounting shaft 5 is formed at its both ends with two parallel flat faces 12 and 13. The flat faces 12 and 13 are parallel to a plane including an axial center of the rotational main shaft 2 and an axial center of the mounting shaft 5. Axial bores 14 are respectively perforated at the side plates 10 and 11. Each axial bore 14 has a sectional shape similar to but larger than a sectional shape of the axial ends of the mounting shaft 5 formed with the parallel flat faces 12 and 13.

Therefore, the mounting shaft 5 is rotated integrally with the supporting bracket 6, and is movable radially to the supporting bracket 6.

Small-diameter parts 15 and 16 are formed at the supported part 8 of the mounting shaft 5. O-rings 17 and 18 formed of synthetic resin, etc., are engaged between the small-diameter parts 15, 16 and the bore 9 of the supporting bracket 6.

The above-described mounting shaft 5 is disposed such that a part of the outer peripheral surface 20 of the outer race member 19 of the bearing 3 to be tested is projected radially outwardly from the supporting bracket 6 when a centrifugal force is not applied to the bearing 3 to be tested.

The sun ring 21 surrounds all the mounting portions 4 and is disposed concentrically with the rotational main shaft 2 in the supporting frame 1. An inner peripheral surface 22 of the sun ring 21 is used as a rolling track of the outer race members 19 of the respective bearings 3 to be tested. The outer race members 19 of the bearings 3 to be tested are rotated in contact with the inner peripheral surface 22 of the sun ring 21 when the rotational main shaft 2 is rotatably driven.

An outer peripheral surface 23 of the sun ring 21 is formed in a spherical surface having a radius R concentrically with the sun ring 21. An inner peripheral surface 25 of the outer ring 24 fixed to the supporting frame 1 is brought into contact with the outer peripheral surface 23 of the sun ring 21, and is formed in a spherical surface having the radius R to hold the outer peripheral surface 23 of the sun ring 21.

The inner peripheral surfaces of the outer ring 24 at both sides of the inner peripheral surface 25 thereof are formed in circumferentially flat cylindrical surfaces 26 and 27 in a structure in which the sun ring 21 can be detachably attached. The sun ring 21 can be interference-fit into the outer ring 24.

Each bearing 3 to be tested is engaged with the mounting portion 7 of the mounting shaft 5 removed from the supporting bracket 6 by means of side plates 29 and 30.

In the embodiment shown in FIGS. 1 and 2, the side plates 29 and 30 are formed as annular plates having uniform thickness. However, they may be formed with an annular step portion 31 on an outer periphery thereof to reduce its weight likewise a side plate 31 shown in FIG. 5.

The side plate 31 gives a large centrifugal load to the bearings 3 to be tested by means of the weights thereof when the rotational main shaft 2 is rotated. The centrifugal load generated can be regulated or altered according to the size of the annular step portion 32 thereof, or can also be regulated or altered by altering the material of the side plates 29, 30, 31.

Lubricating oil to be used at the time of the endurance test is supplied through an oil hole 33 of the rotational main shaft 2, an oil hole 34 of the supporting bracket 8 and an oil hole 35 of the mounting shaft 5. In FIG. 1, reference numerals 34A and 35A denote blocking plugs of the oil holes 34 and 35.

As described above, the relationship between the inner diameter $d_2$ of the axial bore 9 of the supporting bracket 6 and the outer diameter $d_1$ of the supported part 8 of the mounting shaft 5 is $d_2 > d_1$, and the larger radial gap L is provided. Further, centerlines of the mounting shaft 5 and the axial bore 9 coincide by the O-rings 17 and 18. When the rotational main shaft 2 is rotated at a high speed, the mounting shaft 5 is displaced radially outwardly within the range of the radial gap L by the centrifugal force. In this case, the displacing distance is covered by the elastic deformations of the O-rings 17 and 18, and no oil leakage occurs.

In the embodiment described above, the detachable bracket 6B of the supporting bracket 6 is removed, the bearings 3 to be tested are mounted on the removed mounting shafts 5, and the ends of the mounting shafts 5 are inserted into the axial holes 14 of the side plates 10 and 11 so that the bearings 3 to be tested are mounted by the detachable bracket 6B. When the rotational main shaft 2 is then rotatably driven, the bearings 3 to be tested are rotated around the rotational main shaft 2 at the same rotating frequency as that of the main shaft 2. Simultaneously, the outer periphery 20 of the outer race member 19 of each bearing 3 is rotated around its own axis in contact with the inner periphery 22 of the sun ring 21. The rotating frequency of the rotation around its own axis of the outer race member 19 of the bearing 3 is remarkably higher than that of the rotational main shaft 2.

Since the mounting shaft 5 can be displaced in the radial outward direction in a range of the radial gap L between the axial bore 9 of the supporting bracket 6 and the supported portion 8 of the mounting shaft 5 by the centrifugal force generated upon rotation around the main shaft 2, it can be rotated around its own axis in a state that the centrifugal load is sufficiently acted.

The sun ring 21 is also rotated by the drag of the rotation around its own axis of the bearing 3 to be tested. Since the outer periphery of the radius R of the sun ring 21 is enclosed by the inner periphery 25 of the radius R of the outer ring 24, a centripetal action is always generated, and the inner periphery 22 of the sun ring 21 and the outer periphery 20 of the outer race member 19 of the bearing 3 are brought into contact with each other without deviation over the whole inner periphery 22.

In FIGS. 1 and 2, reference numerals 36 and 37 denote thrust washers.

According to the first aspect of this invention as described above, the bearing to be tested is rotated around the rotational main shaft at the equal speed to that of the rotational main shaft, and simultaneously the outer race member of the bearings to be tested is rotated around its own axis at remarkably high speed in contact with the sun ring. At this time, the mounting shaft is journaled to the supporting bracket with the displacing margin toward the radially outward direction to the rotational main shaft. Therefore, the outer race member is strongly brought into pressure contact with the inner periphery of the sun ring by the centrifugal force generated upon rotation around the main shaft, and rotated around its own axis at the high speed under strong pressure contact therewith. As a consequence, an endurance test such as a seizure resistance test can be executed in a state similar to the actual using state.

According to the second aspect of this invention, radially outward displacement of the mounting shaft can be effectively generated by the difference between the diameter of the axial bore of the supporting bracket and the diameter of the mounting shaft.

What is claimed is:

1. A machine for testing a centrifugal load of a bearing including an outer race member, comprising
   a supporting frame including a sun ring, and
   a rotational main shaft including mounting portions for mounting the bearing to be tested, said mounting portions including a mounting shaft for mounting the bearing to be tested and a supporting bracket for supporting said mounting shaft,
   said mounting portions being fixedly projected integrally from an outer peripheral portion of said rotational main shaft at an equal interval in a circumferential direction,
   each of said mounting portions having the same structure,
   said mounting shaft being arranged in said supporting bracket in parallel with the rotational main shaft in such a manner that a part of an outer peripheral surface of said outer race member is projected radially outwardly from said supporting bracket,
   said mounting shaft being journaled to a supporting bracket with a displacing margin in a radially outward direction to said rotational main shaft,
   said sun ring being concentric with said rotational main shaft and surrounding said mounting portion, and
   an inner peripheral surface of said sun ring being used as a track to be rolled with the outer race members of said respective bearings to be tested.

2. The machine for testing a centrifugal load of a bearing according to claim 1, wherein an outer diameter of a supported part of said mounting shaft is smaller than an inner diameter of an axial bore of said supporting bracket.

* * * * *